United States Patent
Inokuchi et al.

(10) Patent No.: US 9,242,891 B2
(45) Date of Patent: Jan. 26, 2016

(54) SANITARY WARE HAVING GLAZE LAYER HAVING EXCELLENT BASE-COVERING PROPERTIES

(75) Inventors: Kohei Inokuchi, Fukuoka-Ken (JP); Takahiro Hino, Fukuoka-Ken (JP); Katsuhiro Kawakami, Fukuoka-Ken (JP); Tomoyasu Ichiki, Fukuoka-Ken (JP)

(73) Assignee: Toto Ltd., Fukuoka (JP)

( * ) Notice: Subject to any disclaimer, the term of this patent is extended or adjusted under 35 U.S.C. 154(b) by 78 days.

(21) Appl. No.: 13/876,055

(22) PCT Filed: Sep. 27, 2011

(86) PCT No.: PCT/JP2011/072711
§ 371 (c)(1),
(2), (4) Date: Mar. 26, 2013

(87) PCT Pub. No.: WO2012/043848
PCT Pub. Date: Apr. 5, 2012

(65) Prior Publication Data
US 2013/0189488 A1    Jul. 25, 2013

(30) Foreign Application Priority Data

Sep. 29, 2010 (JP) ................. 2010-218733
Sep. 12, 2011 (JP) ................. 2011-198213

(51) Int. Cl.
| C03C 8/14 | (2006.01) |
| C03C 8/04 | (2006.01) |
| C04B 41/00 | (2006.01) |
| C04B 41/50 | (2006.01) |
| C04B 41/86 | (2006.01) |
| C04B 111/80 | (2006.01) |

(52) U.S. Cl.
CPC ... *C03C 8/14* (2013.01); *C03C 8/04* (2013.01); *C04B 41/009* (2013.01);

(Continued)

(58) Field of Classification Search
CPC ........ B01J 21/063; B01J 21/066; B01J 35/004; C03C 8/04; C03C 8/14; C03C 2204/00; C04B 41/009; C04B 41/5022; C04B 41/86; C04B 33/00; C04B 41/4539; C04B 2111/80; C04B 2103/56; C04B 41/52; C04B 41/89; C04B 41/4537; C04B 41/5041; C04B 41/5042; C04B 2111/00827; E03C 1/14; E03D 11/02; B32B 9/00–9/007
USPC ................... 428/141, 149; 427/376.2; 501/14
See application file for complete search history.

(56) References Cited

U.S. PATENT DOCUMENTS

| 6,548,162 B1 | 4/2003 | Machida et al. |
| 6,699,606 B2 | 3/2004 | Machida et al. |

(Continued)

FOREIGN PATENT DOCUMENTS

| JP | 3339640 B2 | 10/2002 |
| JP | 2003-040692 A | 2/2003 |

(Continued)

OTHER PUBLICATIONS

Machine Translation of JP 2003-246647. Sep. 2, 2003.*

*Primary Examiner* — Maria Veronica Ewald
*Assistant Examiner* — Brian Handville
(74) *Attorney, Agent, or Firm* — Carrier Blackman & Associates, P.C.; Joseph P. Carrier; William D. Blackman

(57) ABSTRACT

Disclosed are sanitary wares such as toilet bowls or wash bowls that have a glaze layer which can conceal the body of the sanitary wares satisfactorily without the need to use any opacifier and which is less likely to be contaminated. The sanitary ware includes: a sanitary ware body; and a glaze layer having a single-layer structure as a sole glaze layer on the sanitary ware body, the glaze layer comprising a phase-separated glass as the major part and the glaze layer having a surface roughness Ra of not more than 0.07 μm. Thus, the body of the sanitary ware can be concealed satisfactorily, and, in a preferred embodiment, a good white color can be imparted to the sanitary ware.

7 Claims, 1 Drawing Sheet

(52) U.S. Cl.
CPC ............ *C04B 41/5022* (2013.01); *C04B 41/86* (2013.01); *C03C 2204/00* (2013.01); *C04B 2111/80* (2013.01); *Y10T 428/24355* (2015.01); *Y10T 428/24421* (2015.01)

(56) References Cited

U.S. PATENT DOCUMENTS

2003/0134107 A1* 7/2003 Machida et al. ............. 428/336
2009/0176639 A1* 7/2009 Jacques et al. ................. 501/17

FOREIGN PATENT DOCUMENTS

| JP | 2003-246647 A | 9/2003 |
| JP | 2003-246689 A | 9/2003 |
| JP | 4395821 B2 | 1/2010 |
| WO | 99/61392 A1 | 12/1999 |

* cited by examiner

SANITARY WARE HAVING GLAZE LAYER HAVING EXCELLENT BASE-COVERING PROPERTIES

RELATED APPLICATION

This application is based upon and claims the benefit of priority from the prior Japanese Patent Application No. 218733/2010 filed on Sep. 29, 2010 and No. 198213/2011 filed on Sep. 12, 2011, the entire contents of which are incorporated herein by reference.

TECHNICAL FIELD

The present invention relates to sanitary wares such as toilet bowls or wash bowls. More particularly, the present invention relates to sanitary wares having a glaze layer that excels in body-concealing properties.

BACKGROUND ART

In sanitary wares such as toilet bowls or wash bowls, a glaze layer is provided on the outermost surface thereof from the viewpoints of ensuring a sanitary surface that is less likely to be contaminated and of ensuring design of appearance. The property that contaminants are less likely to be deposited can allow users to feel comfortable and, at the same time, can reduce a load on cleaning work of users. Because of this, various proposals have been made on sanitary wares having a surface that is less likely to be contaminated. For example, in order to improve antifouling properties by rendering the surface more smooth, JP 3339640B (PTL 1) proposes a technique in which Ra of the surface of sanitary wares is brought to 0.07 μm or less, and JP 4395821B (PTL 2) proposes a technique in which the surface is brought to such a state that silica particles having a particle diameter of 10 μm or more are absent.

In order to impart good design while having smoothness and antifouling properties, the surface of sanitary wares has a function of concealing the color of the sanitary ware body. An example of a method for concealing the color of the sanitary ware body is to add an opacifier such as zircon to glazes.

On the other hand, some of the present inventors have proposed in JP 2003-246647A (PTL 3) and JP 2003-246689A (PTL 4) sanitary wares produced using phase-separated glass. These publications disclose a method for forming a glaze layer having a two-layer structure on a sanitary ware by one film formation step. The claimed advantage is to impart functions such as strength and coloring to an underlying layer by adopting a construction of mutually different upper layer and lower layer. In particular, JP 2003-246647A (PTL 3) describes that the diameter of spherical particles is brought to 100 nm. According to this technique, a separated-phase structure of such spherical particles is previously formed and ground, and the spherical structure is melted to obtain a glaze layer. That is, in the techniques in these patent documents, glaze materials should be previously subjected to phase separation, and, further, there is room for an improvement in concealment of the body. In JP 2003-246647A (PTL 3), white color is developed due to crystalline nature to conceal the body. Accordingly, there is room for an improvement in alkali resistance.

CITATION LIST

Patent Literature

[PTL 1] JP 3339640B
[PTL 2] JP 4395821B
[PTL 3] JP 2003-246689A
[PTL 4] JP 2003-246647A

SUMMARY OF THE INVENTION

Technical Problem

The present inventors have now found that a glaze layer having a single-layer structure formed of a phase-separated glass can satisfactorily conceal the body of sanitary wares and, in a preferred embodiment, can impart good white color to sanitary wares. The present invention has been made based on such finding.

Accordingly, an object of the present invention is to provide a sanitary ware having a glaze layer that excels in the capability of concealing the body of the sanitary ware.

Solution to Problem

According to the present invention, there is provided a sanitary ware comprising: a sanitary ware body; and a glaze layer having a single-layer structure as a sole glaze layer on the sanitary ware body, the glaze layer comprising a phase-separated glass as the major part and the glaze layer having a surface roughness Ra of not more than 0.07 μm.

Effect of the Invention

The present invention provides a sanitary ware having a glaze layer that excels in the capability of concealing the body of the sanitary ware. Further, a good white color can be imparted to sanitary wares. Furthermore, in the present invention, the glaze layer has a single-layer structure and can be formed in a single step. Accordingly, the present invention is also advantageous in that the step of forming the glaze layer may be a single step.

DESCRIPTION OF EMBODIMENTS

Definition

Figure 1:
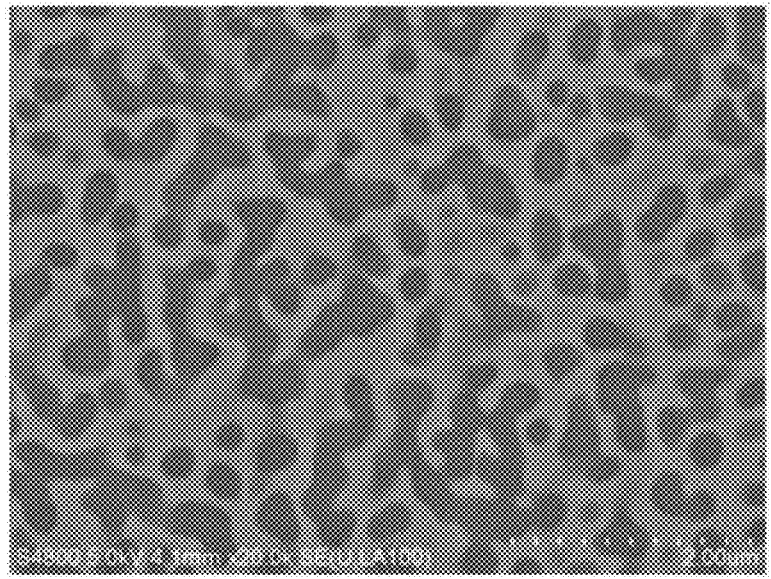
FIG. 1 is an electron photomicrographic image of an entanglement structure (spinodal) as a separated phase form in a sample prepared in Example 2.

In the present invention, the term "sanitary ware" means a ceramic ware product used in toilets and around lavatories, specifically toilet bowls, urinals, strainers for urinals, flush tanks for toilets or urinals, washbowls in washstands, or wash hand basins. The term "ware" means, among ceramic wares, those that have a degree of sintering that is somewhat water-absorptive and has a surface to which a glaze has been applied.

Glaze Layer

The sanitary ware according to the present invention has a glaze layer having a single-layer structure as a sole glaze layer provided on a sanitary ware body. The glaze layer comprises a phase-separated glass as the major part and has a surface roughness Ra of not more than 0.07 μm. The body of the sanitary ware can be concealed well by adopting a glaze layer having the above construction in the sanitary ware. In a preferred embodiment of the present invention, the sanitary ware has a surface roughness Ra of not more than 0.07 μm measured after an alkali test that includes immersing the sanitary ware in a 5 wt % aqueous sodium hydroxide solution, heating the sodium hydroxide solution containing the sanitary ware to 70° C., and allowing the sodium hydroxide solution containing the sanitary ware to stand in this state for 20 hr.

The glaze layer in the sanitary ware according to the present invention can be realized by using a phase-separated glass. In the present specification, the phase-separated glass means a glass having a property that, when a melt in a homogeneous state within a specific composition range is supercooled to a temperature of or below a liquidus line, the glass phase is separated into two phases in a metastable immiscible range, according to a thermodynamic requirement. As a result, in the present invention, a form in which one of the formed two phases is dispersed in particles (binodal) or a form in which the two phases are entangled with each other (spinodal) is provided, and a separated-phase structure is formed in an embodiment not considered as two thin-film layers having an interface. A white color is developed in the glass having this separated phases due to scattering by an interface of the two phases. Accordingly, the body can be concealed by a method other than the method in which opacifiers (such as zircon) are added. Therefore, the present invention can reduce a problem involved in the conventional opacifier-containing glazes for sanitary wares, that is, a surface deterioration that occurs during long-term use due to a difference in erosion rate by water between the glass and the opacifier.

In a preferred embodiment of the present invention, when particles produced by phase separation of the phase-separated glass in the glaze layer have an independent liquid droplet structure (binodal), the diameter of the liquid droplets is not less than 100 nm, preferably not less than 150 nm, more preferably not less than 200 nm; and, when the particles have an entanglement structure (spinodal), the mean width of branches in the entangled product is not less than 100 nm, preferably not less than 150 nm, more preferably not less than 200 nm. Such particle diameters can allow the body of the sanitary ware to be satisfactorily concealed. Further, the lightness L* of the surface of the glaze layer can be brought to not less than 85, and a sanitary ware that develops a good white color can be obtained.

In a preferred embodiment of the present invention, particles having a size of not more than 50 nm may be observed on the surface of the glaze layer. However, in this case, the diameter of particles in the glaze layer is gradually increased beyond 50 nm from the surface layer towards the body. When the above requirement is met, a surface deterioration derived from a difference in erosion rate between two phases of the glass can be further reduced.

In a further preferred embodiment of the present invention, when particles produced by phase separation of the phase-separated glass in the glaze layer have an independent liquid droplet structure (binodal), not less than 15% by volume of the whole volume of the glaze layer is accounted for by the particle; and, when the particles have an entanglement structure (spinodal), not less than 25% by volume of the whole volume of the glaze layer is accounted for by the particle. When the volume ratio is in the above-defined range, the body of the sanitary ware can be satisfactorily concealed.

In the present invention, the thickness of the glaze layer is preferably not less than 0.3 mm, more preferably not less than 0.40 mm. When the thickness of the glaze layer is in the above-defined range, the lightness L* of the glaze layer surface can be brought to not less than 85 and a sanitary ware that develops a good white color can be obtained.

In a preferred embodiment of the present invention, the content of quartz in the glaze layer is not more than 1.5% by volume, more preferably not more than 0.5% by volume. When the quartz content is in the above-defined range, a surface deterioration that occurs during long-term use due to a difference in erosion rate by water between the glass phase and the quartz can be more reliably suppressed.

In a preferred embodiment of the present invention, the glaze layer has a basicity, as defined by the following formula, of 0.20 to 0.40:

Basicity=(network modifier)/(network former+intermediate).

Basicity=(network modifier [mol%])/(network former [mol%]+intermediate [mol%])

where the network modifier means CaO, MgO, ZnO, SrO, $K_2O$, $Na_2O$, $Li_2O$ and the like, the network former means $SiO_2$ and the like, and the intermediate means $Al_2O_3$ and the like. The basicity in the above-defined range can provide a suitable level of melt viscosity can be advantageously obtained in the preparation of the sanitary ware.

In a preferred embodiment of the present invention, the glaze layer has the following formulation:
$SiO_2$: 68 to 76% by mole
$Al_2O_3$: 4.0 to 5.4% by mole
CaO: 7.0 to 15.0% by mole
MgO: 0 to 2.0% by mole
ZnO: 5.0 to 10.0% by mole
$K_2O$: 2.0 to 5.0% by mole
$Na_2O$: 0 to 2.0% by mole In the present invention, the body can be concealed without the need to use an opacifier. However, it should be noted that the presence of the opacifier is not completely excluded. In the present invention, further complement of color development derived from the phase-separated glass by the opacifier is acceptable. In some cases, the addition of the opacifier can provide a sanitary ware that realizes more stable color development. As a result, sanitary wares having an even quality can be advantageously manufactured. In the present invention, the opacifier may be added in such an amount that does not sacrifice the alkali resistance of the sanitary ware according to the present invention. Preferably, the content of the opacifier in the glaze layer is not more than 8% by weight. Opacifiers that are commonly added to the glaze layer of sanitary wares may be used as the opacifier. An example thereof is zircon.

Body of Sanitary Ware

The ware body of the sanitary ware according to the present invention is not particularly limited and may be a conventional sanitary ware body. A body layer that functions as an intermediate layer having properties different from those of the body may also be provided on the underside of the glaze layer that is an outermost layer and has the above surface properties. According to this construction, the entry of air bubbles into the glaze layer from the body layer in a baking process in the manufacture of the sanitary ware can be suppressed, and a glaze layer having a better appearance can be formed.

Manufacturing Method

Preferably, the sanitary ware according to the present invention is manufactured by the following method.

At the outset, a sanitary ware body is provided. The sanitary ware body may be obtained by properly molding a conventional slurry for a sanitary ware body, the slurry being prepared using quartz sand, pottery stone, clay and the like as starting materials, into a sanitary ware body.

A glaze slurry for the formation of a surface glaze layer is provided. The use of a slurry of a glaze having a particle diameter of not more than 10 μm, preferably not more than 5 μm, at a volume fraction of 50% is preferred. When the slurry of the glaze having the above-defined particle diameter range is used, the quartz is satisfactorily vitrified at a baking temperature of 1100 to 1330° C. and, thus, the stay of the quartz on the glaze surface can be suppressed. The slurry of the glaze having the above-defined particle diameter range can be obtained by ball-milling starting materials for the glaze.

In another preferred embodiment of the present invention, the quartz starting material such as quartz sand for use in the glaze slurry is preferably a ground product having a particle diameter of not more than 10 μm, preferably not more than 5 μm, at a volume fraction of 50%. That is, the particle diameter of the quartz is preferably regulated separated from other starting materials for the glaze. The use of this glaze slurry can realize more reliable suppression of the stay of the quartz on the glaze surface.

In a further preferred embodiment of the present invention, a frit starting material formed of an amorphous glass is preferred for use as a starting material for a glaze slurry. The frit starting material can be obtained by melting a starting materials, for a glaze, including quartz sand, feldspar, lime, and clay at an elevated temperature of 1300° C. or above. When the frit starting material formed of an amorphous glass is used as the starting material for a glaze slurry, a conventional non-frit starting material may be mixed as part of the starting material for the glaze slurry. When the non-frit starting material is mixed in an amount of not less than 3% by weight, the regulation of liquidity of a glaze slurry that is necessary in applying the glaze slurry on a sanitary ware body is easy.

The glaze slurry is applied to a sanitary ware body. In the application of the glaze slurry, any method may be used without particular limitation, and a proper method may be selected from conventional methods such as spray coating and dip coating.

The sanitary ware body with a precursor layer for the surface glaze layer formed thereon is then baked. The baking is carried out at a temperature that sinters the sanitary ware body and softens the glaze, specifically at 1000° C. to 1300° C., preferably 1150° C. to 1250° C. Since the separated-phase structure in the glaze layer according to the present invention is grown in a cooling process, the cooling rate is preferably regulated in a temperature range (a separated-phase growth temperature range) between 850° C. and 1100° C. When the cooling rate is excessively high, the separated phases are not satisfactorily grown and, thus, the body cannot be satisfactorily concealed. Accordingly, the cooling rate is preferably not more than 300° C./hr in a temperature range between 850° C. and 1100° C.

EXAMPLES

The present invention is further illustrated by the following Examples that are not intended as a limitation.

Composition of the Glaze

In the following Examples, glazes having compositions (% by weight) specified in Table 1 below are used.

TABLE 1

| Glaze | SiO$_2$ | Al$_2$O$_3$ | CaO | MgO | ZnO | K$_2$O | Na$_2$O |
|---|---|---|---|---|---|---|---|
| 1 | 65.5 | 5.5 | 16.5 | 2.0 | 6.5 | 3.0 | 1.0 |
| 2 | 66.5 | 5.0 | 16.0 | 2.0 | 6.5 | 3.0 | 1.0 |
| 3 | 72.5 | 4.5 | 11.5 | 1.5 | 4.5 | 4.5 | 1.0 |

Example 1

Starting materials for glaze, such as quartz sand, feldspar, lime, and clay were mixed so as to provide a composition of glaze 1 specified in Table 1 above. The mixture was melted at 1550° C. to give a starting material for a frit. The starting material, together with water, was ball-milled to a particle diameter of 6 μm at a volume fraction of 50% to prepare a glaze slurry. The glaze slurry thus obtained was spray-coated on a conventional unbaked sanitary ware body having a size of about 10 cm square and a thickness of 1 cm to glaze the body to a glaze thickness (after baking) of about 0.4 mm. Thereafter, the glazed body was baked in an electric oven under conditions of a maximum temperature of 1200° C. and a cooling rate from 1100° C. to 850° C. of 185° C./hr to obtain an evaluation sample.

Example 2

An evaluation sample was obtained in the same manner as in Example 1, except that a glaze composition of glaze 2 specified in Table 1 was adopted and the thickness of the glaze was about 0.6 mm.

Example 3

An evaluation sample was obtained in the same manner as in Example 2, except that a glaze composition of glaze 3 specified in Table 1 was adopted.

Example 4

An evaluation sample was obtained in the same manner as in Example 3, except that the thickness of the glaze was about 0.3 mm.

Example 5

An evaluation sample was obtained in the same manner as in Example 3, except that the cooling rate from 1100° C. to 850° C. was 420° C./hr.

Example 6

An evaluation sample was obtained in the same manner as in Example 3, except that a glaze slurry prepared by mixing starting materials for a glaze, such as quartz sand, feldspar, lime, and clay, so as to give a glaze composition 3 without using the starting material for a frit, and ball-milling the mixture was used as the glaze slurry.

Example 7

A commercially available sanitary ware (manufactured by TOTO LTD.; white, glaze layer: single-layer structure) was provided. An evaluation sample was obtained by taking off a flat portion by 10 cm. This sample was provided as a comparative prior art sample and had a most commonly used glaze composition for sanitary wares, that is, had a single glaze layer formed of a mixture composed of glass and a pigment. The thickness of the glaze layer in the sample used for the evaluation was 0.45 mm.

Example 8

A commercially available sanitary ware (manufactured by TOTO LTD.; white, CeFiONtect product, glaze layer: two-layer structure) was provided. An evaluation sample was obtained by taking off a flat portion by 10 cm. This sample was provided as a comparative prior art sample and had a two-layer structure for antifouling property enhancement purposes described in JP 3339640B (PTL 1). Specifically, the glaze layer in this sample was the same as that in the conventional glaze layer in Example 7, except that a transparent glass layer containing no significant impurities was additionally provided on the conventional glaze layer from the viewpoint of improving surface smoothness and the like. For the glaze layer in the sample for the evaluation, the thickness of the lower layer that was the conventional glaze layer was 0.43 mm, and the thickness of the upper layer that was the transparent layer was 0.20 mm.

Figure 2:
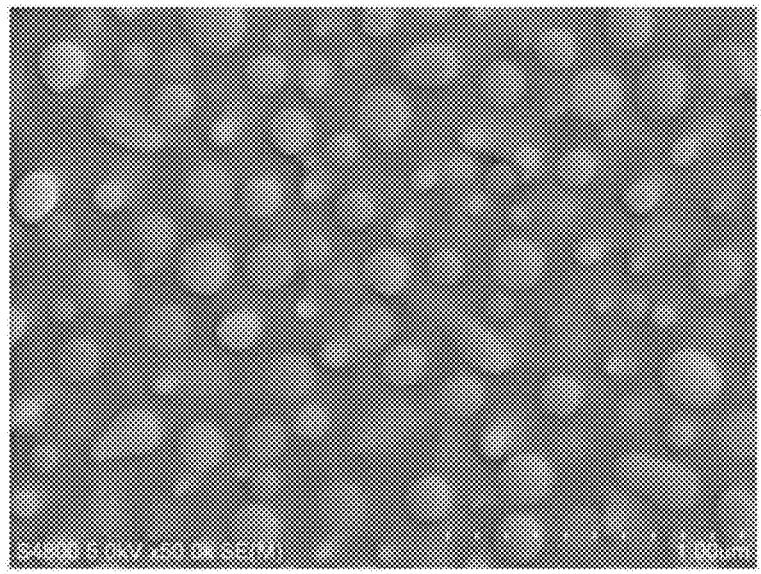
FIG. 2 is an electron photomicrographic image of an independent liquid droplet structure (binodal) as a separated phase form in a sample prepared in Example 3.

Property Value Measurement: Observation of Separated Phase Form and Measurement of Size and Volume Ratio The size and volume ratio of separated phase in the glaze layer were measured as follows. The cross section of the evaluation sample was planished, and, in a region including a separated phase having a maximum size of 100 to 150 μm from the surface governing color development, the separated phase form was observed under a reflection electron microscope at a magnification of 20000 times to 50000 times. Further, an image of the separated phase was photographed and was processed to measure the separated phase size and the volume ratio of the two phases. In the measurement of the separated phase size, for particles having a binodal form, the mean particle diameter of the phase constituting the particles was determined, and, for particles in a spinodal form, the mean width of branches was determined. The results were as shown in Table 2 below. Images photographed under an electron microscope for samples in Examples 2 and 3 are shown in FIGS. 1 and 2, respectively.

Property Value Measurement: Measurement of Content of Quartz

The content of quartz in the glaze layer was measured as follows. The evaluation sample was pretreated by etching the surface of the sample with a 5 wt % aqueous sodium hydroxide solution at 70° C. for one hr. An image of the surface of the evaluation sample was photographed under a reflection electron microscope at a magnification of 200 times. The photographed image was subjected to image processing, and the volume fraction of quartz was measured. The results were as shown in Table 2.

Evaluation Test: Measurement of Surface Roughness Before and after Alkali Durability Test A 5 wt % aqueous sodium hydroxide solution was provided. Each evaluation sample was immersed in the solution, and the whole solution in which the sample was immersed was heated to 70° C. and, in this state, was allowed to stand for 20 hr. Before and after the alkali durability test, the surface roughness Ra of the sanitary ware was measured with a tracer-type surface roughness tester according to JIS B 0651. The results were as shown in Table 2.

Evaluation Test: Measurement of L* (Lightness)

L* was measured as follows. The surface of each evaluation sample was well cleaned with ethanol, and L* of the surface of the glaze layer was measured with a spectrophotometric colorimeter. The measurement with the spectrophotometric colorimeter was carried out under conditions of a light source of D65, a visual field of 10°, and an SCE (regular reflected light removal) method. The results were as shown in Table 2 below.

TABLE 2

| | Conditions for experiment | | | | | Results of property value measurement | | | Results of evaluation test | | |
|---|---|---|---|---|---|---|---|---|---|---|---|
| Example | Composition of glaze | Basicity | Cooling rate 850 to 1100° C. [° C./hr] | Thickness of glaze layer [mm] | Form of phase-separated | Size of phase-separated [nm] | Volume ratio of phase-separated [vol %] | Residual amount of quartz [vol %] | Ra [μm] before alkali test | Ra [μm] after alkali test | Color development L* |
| 1 | 1 | 0.29 | −185 | 0.42 | Bi-nodal | 75 | 13 | 0.1 | 0.023 | 0.029 | 83 |
| 2 | 2 | 0.29 | −185 | 0.60 | Spi-nodal | 190 | 30 | 0.1 | 0.020 | 0.027 | 90 |
| 3 | 3 | 0.23 | −185 | 0.60 | Bi-nodal | 200 | 35 | 0.1 | 0.012 | 0.012 | 90 |
| 4 | 3 | 0.23 | −185 | 0.25 | Bi-nodal | 200 | 35 | 0.1 | 0.021 | 0.027 | 84 |
| 5 | 3 | 0.23 | −420 | 0.60 | Bi-nodal | 100 | 20 | 0.1 | 0.018 | 0.023 | 85 |
| 6 | 3 | 0.23 | −185 | 0.59 | Bi-nodal | 320 | 35 | 1.8 | 0.064 | 0.088 | 91 |
| 7 | — | 0.27 | −185 | 0.45 | Free from phase-separated | Free from phase-separated | Free from phase-separated | 2.8 | 0.098 | 0.254 | 89 |
| 8 | — | 0.27 | −185 | 0.20 0.43 | Free from phase-separated | Free from phase-separated | Free from phase-separated | 0.1 | 0.042 | 0.048 | 89 |

Examples 11 to 18

Evaluation samples were obtained in substantially the same manner as in Example 1, except that zircon was added as an opacifier in an amount specified in Table 3 below to glaze 1 described Table 1 above. For the evaluation samples, the surface roughness Ra was measured before and after the alkali durability test in the same manner as described above in connection with the measurement of surface roughness before and after the alkali durability test in the evaluation test. The results were shown in Table 3.

TABLE 3

| Example | Zircon (wt %) | Ra |
| --- | --- | --- |
| 11 | 1.0 | 0.031 |
| 12 | 2.0 | 0.036 |
| 13 | 3.0 | 0.042 |
| 14 | 4.0 | 0.051 |
| 15 | 5.0 | 0.053 |
| 16 | 6.0 | 0.063 |
| 17 | 7.0 | 0.061 |
| 18 | 8.0 | 0.065 |

The invention claimed is:

1. A sanitary ware comprising:
a sanitary ware body; and
a sole glaze layer provided directly on the sanitary ware body such that an inner surface of the sole glaze layer contacts the sanitary ware body and an outer surface of the sole glaze layer is also an outermost surface of the sanitary ware, wherein
the sole glaze layer has a single layer structure which includes a phase-separated glass as a major part thereof,
the glaze layer having a surface roughness Ra of not more than 0.07 μm and a thickness of not less than 0.3 mm,
the surface of the glaze layer has a lightness L* of not less than 85,
particles of the phase-separated glass in the single layer structure have an independent liquid droplet structure (binodal) or an entanglement structure (spinodal), when the particles have an independent liquid droplet structure (binodal), a diameter of the liquid droplets is not less than 150 nm; and, when the particles have an entanglement structure (spinodal), a mean width of branches in the entanglement structure is not less than 100 nm.

2. The sanitary ware according to claim 1, wherein when particles have an independent liquid droplet structure (binodal), not less than 15% by volume of the whole volume of the sole glaze layer is accounted for by the particles; and, when the particles have an entanglement structure (spinodal), not less than 25% by volume of the whole volume of the sole glaze layer is accounted for by the particle.

3. The sanitary ware according to claim 1, wherein particles observed on the outer surface of the sole glaze layer have a size of not more than 50 nm and the diameter of particles in the sole glaze layer is gradually increased from the outer surface layer towards the sanitary ware body.

4. The sanitary ware according to claim 1, wherein the amount of quartz in the sole glaze layer is not more than 1.5% by volume.

5. The sanitary ware according to claim 1, wherein the sole glaze layer has a basicity, as defined by the following formula, of 0.20 to 0.40:

$$\text{Basicity}=(\text{network modifier})/(\text{network former}+\text{intermediate}).$$

6. The sanitary ware according to claim 1, wherein the sole glaze layer has the following formulation:
$SiO_2$: 68 to 76% by mole,
$Al_2O_3$: 4.0 to 5.4% by mole,
$CaO$: 7.0 to 15.0% by mole,
$MgO$: 0 to 2.0% by mole,
$ZnO$: 5.0 to 10.0% by mole,
$K_2O$: 2.0 to 5.0% by mole, and
$Na_2O$: 0 to 2.0% by mole.

7. The sanitary ware according to claim 1, wherein the sole glaze layer contains not more than 8% by weight of an opacifier.

* * * * *